US009936809B2

(12) United States Patent
Vandenham (10) Patent No.: US 9,936,809 B2
(45) Date of Patent: Apr. 10, 2018

(54) CABINET ASSEMBLY HAVING A RELEASABLE SUPPORT FOOT (71) Applicant: NewAge Products, Inc., Vaughan (CA)

(72) Inventor: Robert Vandenham, Toronto (CA)

(73) Assignee: NewAge Products, Inc., Vaughan, Ontario (CA)

(*) Notice: Subject to any disclaimer, the term of this patent is extended or adjusted under 35 U.S.C. 154(b) by 0 days.

(21) Appl. No.: 15/142,631

(22) Filed: Apr. 29, 2016

(65) Prior Publication Data
US 2017/0311719 A1 Nov. 2, 2017

(51) Int. Cl.
A47B 91/00 (2006.01)
A47B 91/02 (2006.01)
A47B 91/16 (2006.01)
A47B 96/06 (2006.01)

(52) U.S. Cl.
CPC .............. A47B 91/02 (2013.01); A47B 91/16 (2013.01); A47B 96/06 (2013.01); A47B 2220/0027 (2013.01)

(58) Field of Classification Search
CPC ............ B60B 33/0002; B60B 33/0021; B60B 33/0005; B60B 33/0023; Y10T 16/19; Y10T 16/18; A47B 91/005
USPC ............... 248/250, 300, 220.1, 188.8, 188.9; 312/351.1, 351.9, 351.11, 351.12; 16/29, 16/44
See application file for complete search history.

(56) References Cited

U.S. PATENT DOCUMENTS

| 757,712 | A | | 4/1904 | Arnold | |
| 1,895,882 | A | * | 1/1933 | Herold | B60B 33/0002 16/21 |
| 2,667,393 | A | | 1/1954 | Becker | |
| 2,725,667 | A | * | 12/1955 | Ingarra | A47B 91/024 16/19 |
| 2,782,045 | A | * | 2/1957 | Hulbert | B25H 5/00 16/18 R |
| 2,800,679 | A | * | 7/1957 | Schultz, Jr. | B60B 33/0002 16/29 |
| 2,973,233 | A | | 2/1961 | McPhee | |
| 3,118,246 | A | * | 1/1964 | Winter et al. | B41J 29/12 292/76 |
| 3,205,531 | A | * | 9/1965 | Amos | A45C 5/02 16/258 |
| 3,401,908 | A | | 9/1968 | Rapata | |
| 3,556,450 | A | | 1/1971 | Carlson | |

(Continued)

FOREIGN PATENT DOCUMENTS

GB 664683 * 1/1952

Primary Examiner — Janet M Wilkens
(74) Attorney, Agent, or Firm — Howard & Howard Attorneys PLLC (57) ABSTRACT A cabinet assembly includes a base and walls secured to the base to define an interior. The cabinet assembly further includes a pivot pin coupled to the base and a locking device coupled to the base. The locking device is movable relative to the base between an engaged position and a released position. The cabinet assembly additionally includes a support foot. The support foot is fixed to the base in a first orientation when the locking device is in the engaged position. The support foot is movable about the pivot pin to a second orientation spaced from the locking device when the locking device is in the released position.

20 Claims, 6 Drawing Sheets (56) References Cited

U.S. PATENT DOCUMENTS

| | | | |
|---|---|---|---|
| 4,045,104 A * | 8/1977 | Peterson | A47B 47/03 211/182 |
| 4,071,258 A * | 1/1978 | Wallace | A47C 17/86 16/29 |
| 4,227,281 A * | 10/1980 | Chung | B60B 33/0002 16/29 |
| 4,576,391 A * | 3/1986 | Gerstner | B60B 33/0002 16/30 |
| 4,817,237 A * | 4/1989 | Murphy | B60B 33/0002 16/257 |
| 5,354,027 A | 10/1994 | Cox | |
| 5,934,630 A | 8/1999 | Williams et al. | |
| 6,324,724 B1 * | 12/2001 | Reilly, Jr. | A47B 91/002 16/29 |
| 6,701,570 B2 * | 3/2004 | Henriott | A47B 21/06 16/18 R |
| 6,865,774 B2 * | 3/2005 | Devine | B60B 33/0002 16/18 R |
| 6,899,345 B1 * | 5/2005 | Bearden | A01D 34/74 16/19 |
| 7,775,489 B2 | 8/2010 | Facis et al. | |
| 8,671,519 B1 * | 3/2014 | Spraley | B60B 33/001 16/30 |
| 8,967,743 B2 * | 3/2015 | Bernett | A47B 17/00 312/265.6 |
| 2003/0127815 A1 * | 7/2003 | Hall | B60B 33/0002 280/79.3 |
| 2005/0015928 A1 * | 1/2005 | Arsenault | B60B 33/0002 16/300 |
| 2005/0098694 A1 * | 5/2005 | Wetterberg | A47B 47/02 248/220.21 |

* cited by examiner

CABINET ASSEMBLY HAVING A RELEASABLE SUPPORT FOOT

BACKGROUND OF THE INVENTION

1. Field of the Invention

The present invention relates, generally, to a support assembly for a cabinet assembly.

2. Description of the Related Art

Cabinet assemblies known in the art generally include a top, a base, and side walls coupled to the top and base. Cabinet assemblies may be hung on a wall, rest on a shelf, rest on a floor surface, or be otherwise supported. When the cabinet assembly is supported on a floor surface, the cabinet assembly generally includes a support assembly coupled to the base to space the base from the floor surface.

Typically, configurations of cabinet assemblies hanging on a wall or resting on a shelf do not include a support assembly attached to the base. There are many reasons for this. The support assembly takes up unnecessary space, adds weight to whatever surface or shelf the cabinet assembly is supported by, and is aesthetically unappealing.

In some instances, it may be necessary to move a cabinet assembly supported by a floor surface to a shelf or wall, or vice-versa. In these instances, it is necessary to remove the support assembly or a portion of the support assembly to accommodate a change in configuration. To accomplish this, a tool such as a screwdriver, wrench, or drill may be used to remove the support assemblies.

Despite the convenience afforded by common cabinet assemblies to include support assemblies capable of detaching from the cabinet assembly, the process of releasing support assemblies is generally time consuming and requires tools that may not be readily available.

While cabinet assemblies known in the prior art have generally included support assemblies, there remains a need in the art for an improved cabinet assembly that allows a quick release of support assemblies or a portion of support assemblies without the use of tools.

SUMMARY OF THE INVENTION AND ADVANTAGES

One embodiment of a cabinet assembly is provided. The cabinet assembly includes a base. The cabinet assembly further includes walls secured to the base defining an interior. The cabinet assembly additionally includes a pivot pin coupled to the base and a locking device coupled to the base. The locking device is movable relative to the base between an engaged position and a released position. The cabinet assembly further includes a support foot fixed to the base in a first orientation when the locking device is in the engaged position. The support foot is movable about the pivot pin to a second orientation spaced from the locking device when the locking device is in the released position.

The assembly overcomes the disadvantages in the related art in a cabinet assembly for providing a support assembly capable of securing and releasing a support foot without using tools.

In this way, the assembly of the present invention provides improved functionality and usability in securing a support foot to a cabinet assembly and, at the same time, reduces the time and effort required to secure the support foot to the cabinet assembly.

BRIEF DESCRIPTION OF THE DRAWINGS

Advantages of the present invention will be readily appreciated as the same becomes better understood by reference to the following detailed description when considered in connection with the accompanying drawings.

DETAILED DESCRIPTION

Figure 1:
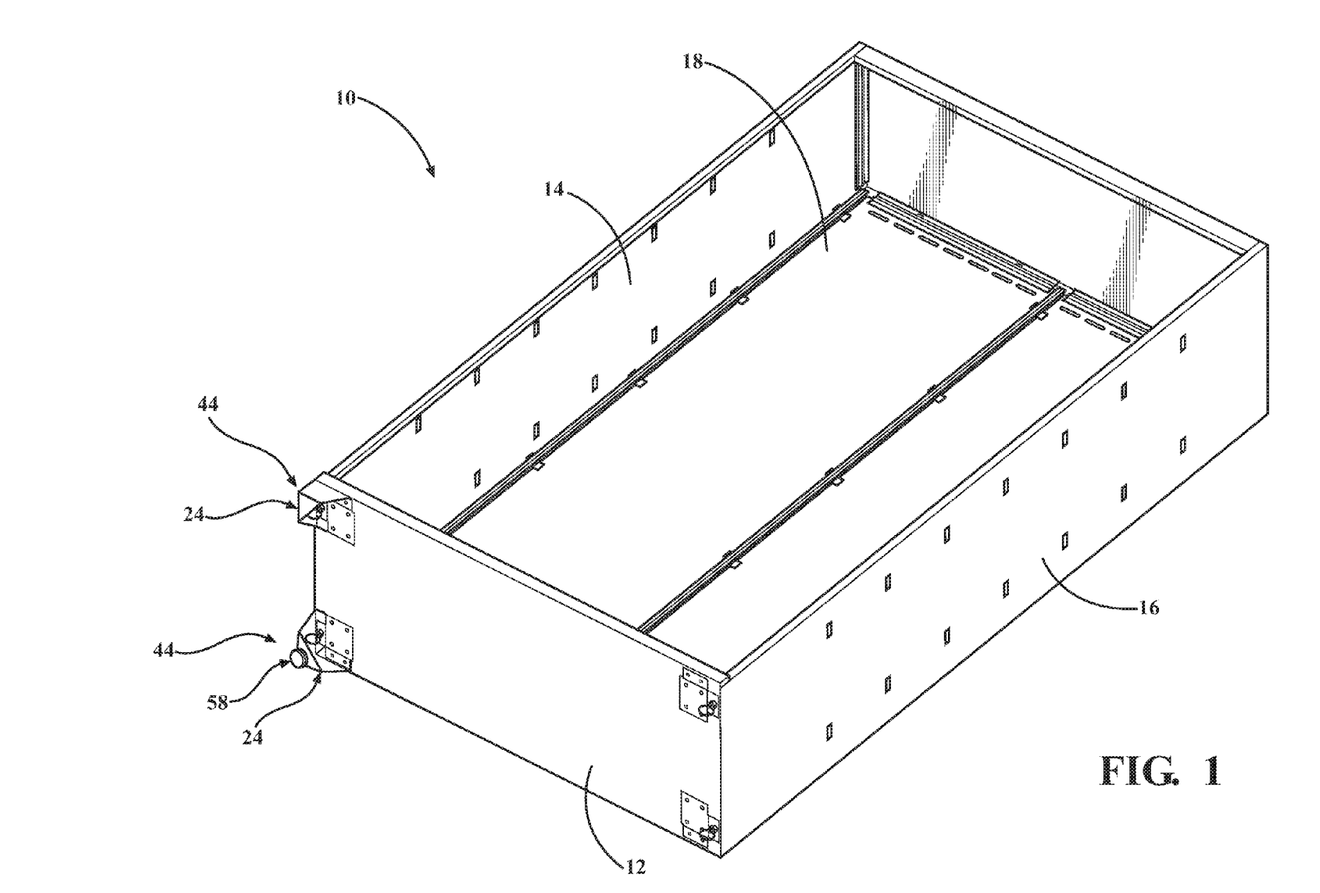
FIG. 1 is a perspective view of a cabinet assembly.

Referring now to the figures, wherein like numerals indicate corresponding parts throughout the several views, a cabinet assembly 10 is generally shown in FIG. 1. Generally, the cabinet assembly 10 includes a base 12 and walls 14,16 secured to the base 12 to define an interior 18. The cabinet assembly 10 may further include a top and a back panel. The cabinet assembly 10 may additionally include shelves or drawers disposed within the interior 18 and coupled to one of the base 12, walls 14,16, top, and back panel. As such, the cabinet assembly 10 may be an enclosed cabinet, such as shown, an open cabinet or book shelf without doors, a dresser, a credenza, a cupboard, a cabinet with any combination of drawers, doors, and shelves, a cabinet as a sub-component of a desk, or any other storage structure having a base 12 and walls 14,16. The base 12, walls 14,16, top, and back panel may be integrally formed with each other in any combination. Alternatively, the base 12, walls 14,16, top, and back panel may be assembled separately. The back panel may comprise one panel or a plurality of panels. The cabinet assembly may further include doors coupled to the walls 14, 16 to close off the interior 18 from surrounding environment. Alternatively, the interior 18 may be open to the surrounding environment for easy access. The cabinet assembly is comprised of a solid material such as metal, plastic, or wood.

Figure 2A:
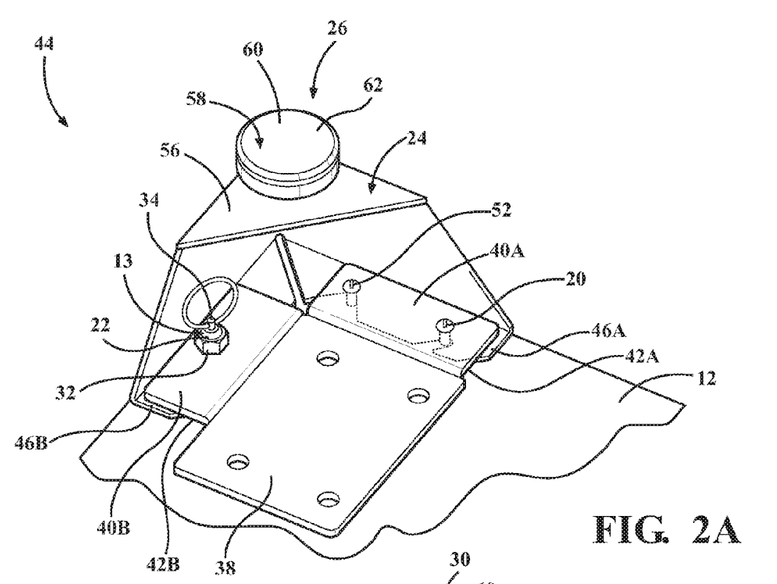
FIG. 2A is a perspective view of the cabinet assembly having a support assembly with a support foot in a first orientation and a locking device in an engaged position.
Figure 2B:
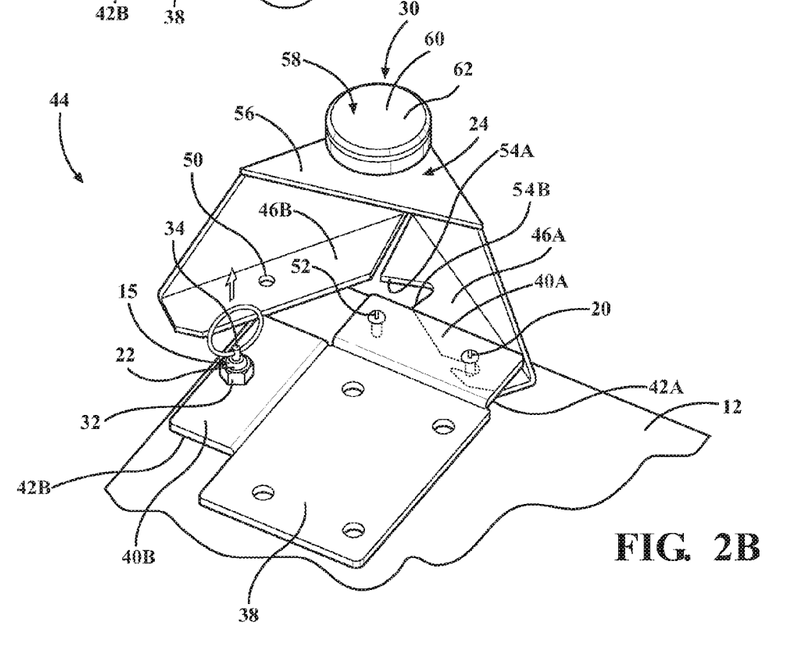
FIG. 2B is a perspective view of the support assembly with the support foot in an intermediate orientation and the locking device in a released position.
Figures 2C, 2D:
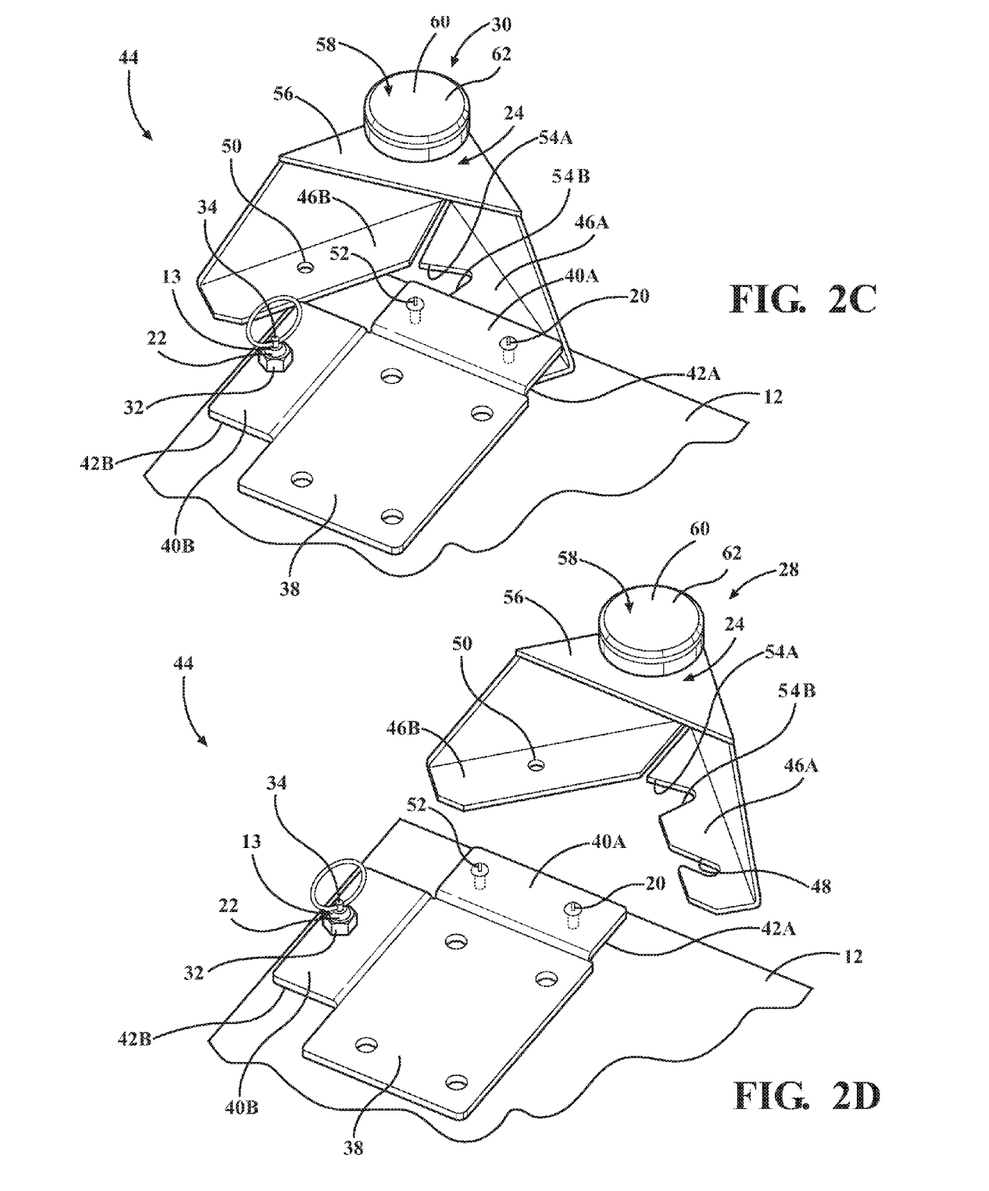
FIG. 2C is a perspective view of the support assembly with the support foot in the intermediate orientation and the locking device in the engaged position.
FIG. 2D is a perspective view of the support assembly with the support foot in a second orientation spaced from the cabinet assembly.

As shown in FIGS. 2A-2D, the cabinet assembly 10 further includes a pivot pin 20 coupled to the base 12 and a locking device 22 coupled to the base 12. The locking device 22 is movable relative to the base 12 between an engaged position 13 and a released position 15. The cabinet assembly 10 additionally includes a support foot 24. As shown in FIG. 2A, the support foot 24 is fixed to the base 12 in a first orientation 26 when the locking device 22 is in the engaged position 13. As shown in FIG. 2D, the support foot 24 is movable about the pivot pin 20 to a second orientation 28 spaced from the locking device 22 when the locking device 22 is in the released position 15. As shown in FIGS. 2B and 2C, the support foot 24 may be disposed in an intermediate orientation 30 between the first 26 and second 28 orientations.

Figure 3:
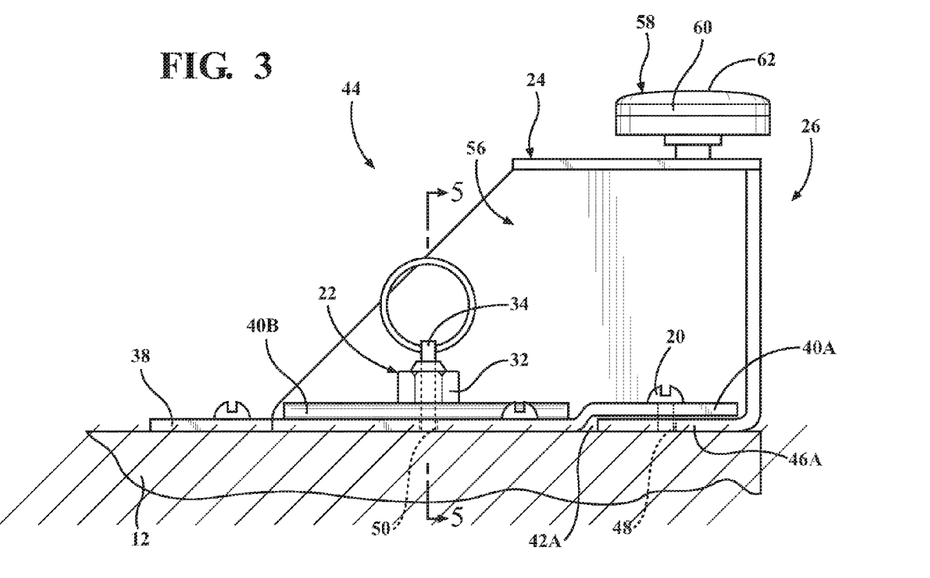
FIG. 3 is a partially cross-sectional side view of the support assembly with the support foot in the first orientation.

As shown in FIG. 3, the support foot 24 is shown engaging the pivot pin 20 in the first orientation 26.

Figure 4:
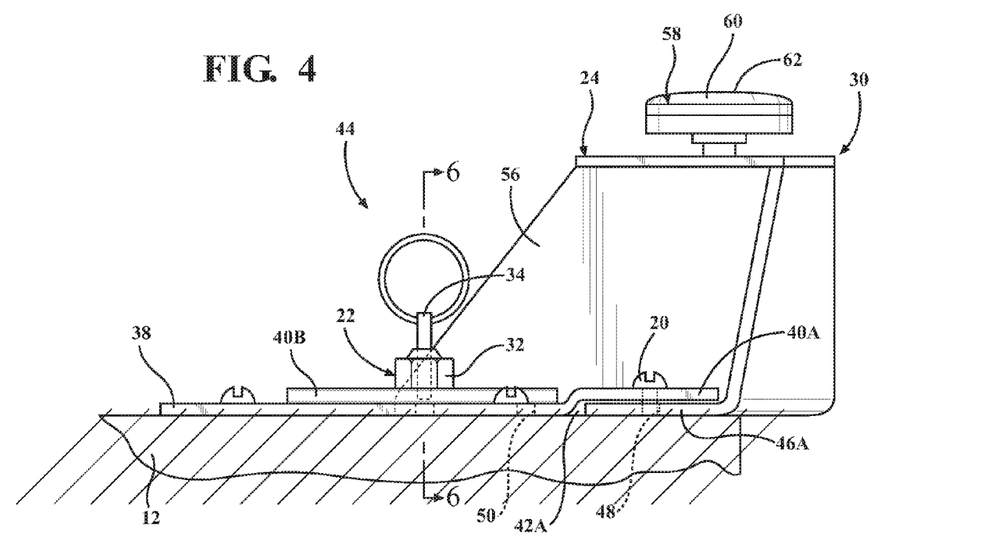
FIG. 4 is a partially cross-sectional side view of one embodiment of the support assembly with the support foot in the intermediate orientation.

As shown in FIG. 4, the support foot 24 is shown engaging the pivot pin 20 in the intermediate orientation 30 between the first 26 and second 28 orientations.

Figure 5:
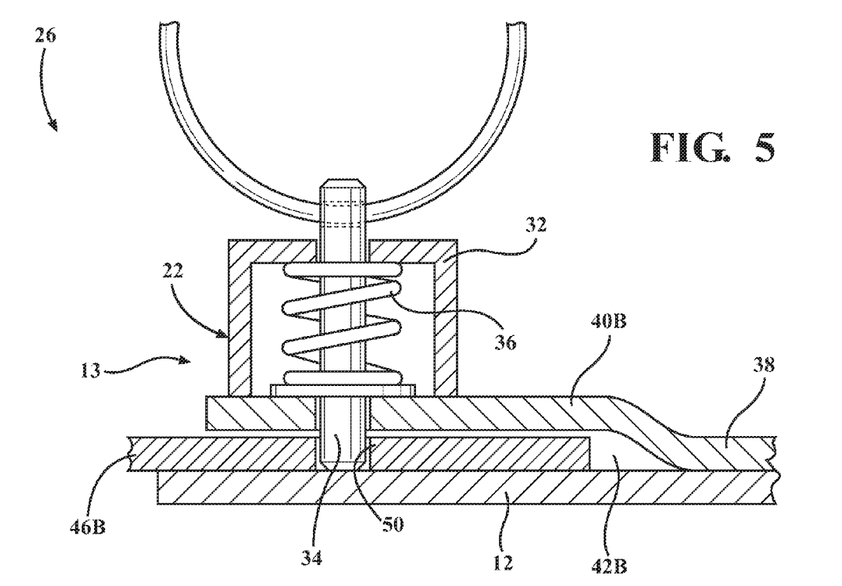
FIG. 5 is a cross-sectional view of FIG. 3 showing a cross section of the support assembly with the support foot in the first orientation being received by a channel defined by a flange and the locking device in the engaged position.
Figure 6:
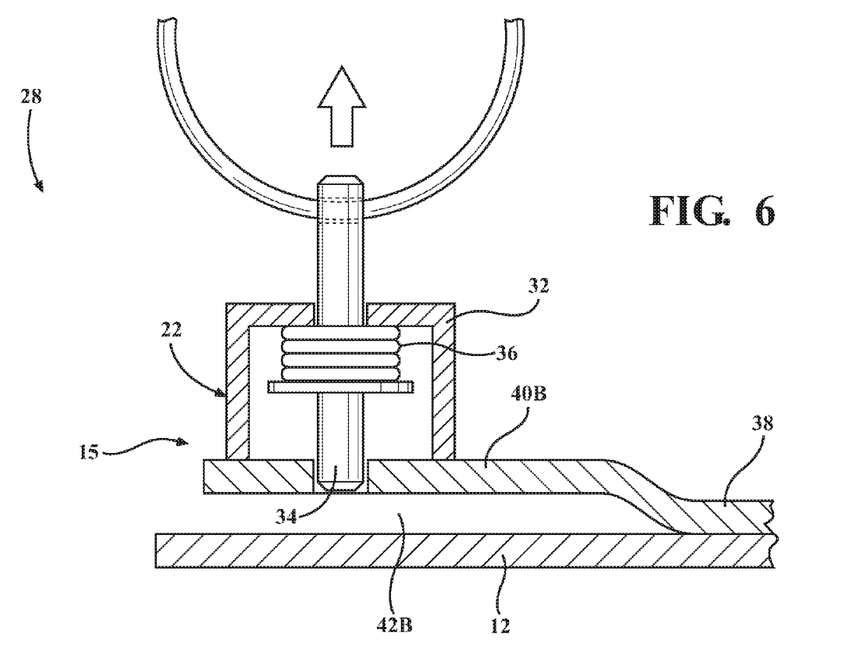
FIG. 6 is a cross-sectional view of FIG. 4 showing a cross section of the support assembly with the support foot in the intermediate orientation and the channel no longer receiving the support foot and the locking device in the released position.

As shown in FIGS. 5-6, the locking device 22 remains fixed relative to the base 12 as the locking device 22 moves between the engaged position 13 and the released position 15. The locking device 22 may include a stationary component 32 fixed to the base 12 and a securing component 34 movably coupled to the stationary component 32. The securing component 34 is movable between the engaged position 13 shown in FIG. 5 and the released position 15 shown in FIG. 6. Furthermore, the securing component 34 may fix the support foot 24 to the base 12 when the support foot 24 is in the first orientation 26. The securing component 34 may be a pin and the locking device 22 may include a biasing element 36 such as a spring for urging the securing component 34 into the engaged position 13.

As shown in FIGS. 2A-2D, the cabinet assembly 10 may further include a bracket 38 coupled to the base 12. The bracket 38 may include at least one flange 40 extending parallel to the base 12 and defines a channel 42 between the flange 40 and the base 12 for receiving a portion of the support foot 24. The distance between the flange 40 and the base 12 may be slightly larger than the thickness of the portion of the support foot 24 to reduce any empty space, thus excess movement of the support foot 24 in the channel 42 when the channel 42 receives the portion of the support foot 24. The flange 40 may extend non-parallel to the base 12 for pinching the portion of the support foot 24 as the portion of the support foot 24 is received in the channel 42.

As shown in FIGS. 2A-2D, the pivot pin 20, the locking device 22, the support foot 24, and the bracket 38 may collectively form a support assembly 44. The embodiment shown in FIG. 1 includes two support assemblies 44 for exemplary purposes. The cabinet assembly 10 of a typical embodiment includes four support assemblies 44. However, it is to be appreciated that the cabinet assembly 10 may include any number of support assemblies 44 without departing from the scope of the invention.

As shown in FIGS. 2A-2D, the support foot 24 defines at least one lip 46 extending from the support foot 24 with the channel 42 receiving the lip 46. The flange 40 is further defined as a first flange 40A and the bracket 38 may further include at least a second flange 40B extending parallel to the base 12 and at an angle relative to the first flange 40A. For simplicity, when the flange 40 is generally described above, it is to be appreciated that the various configurations of the flange 40 apply to both the first 40A and second 40B flanges. Said differently, the configuration of the channel 42 between the flange 40 and the base 12, the distance between the flange 40 and the base 12, the angle the flange 40 extends relative to the base 12 other configurations described above, apply to both the first 40A and second 40B flanges as well.

As shown in FIGS. 2A-2D, the first flange 40A may be perpendicular to the second flange 40B. However, it is to be appreciated that the angle between the first 40A and second 40B flanges may be any angle between zero (0) and three hundred sixty (360) degrees. The angle of the first flange 40A relative to the second flange 40B provides the support assembly 44 with more rigidity than a single, straight flange.

The first 40A and second 40B flanges may be spaced from each other and retain a fixed position relative to each other as shown in the figures. Alternatively, the first 40A and second 40B flanges may be one continuous flange distinguishable by the angle which they extend relative to each other. The channel 42 is further defined as a first channel 42A and the second flange 40B may define a second channel 42B between the second flange 40B and the base 12 for receiving another portion of the support foot 24. For simplicity, when the channel 42 is generally described above, it is to be appreciated that the various configurations of the channel 42 apply to both the first 42A and second 42B channels. The lip 46 is further defined as a first lip 46A and the support foot 24 may define a second lip 46B extending from the support foot 24 at an angle relative to the first lip 46A with the second channel 42B receiving the second lip 46B. For simplicity, when the lip 46 is generally described above, it is to be appreciated that the various configurations apply to both the first 46A and second 46B lips. Similar to the first 40A and second 40B flanges, the first 46A and second 46B lips may be spaced from each other and retain a fixed position relative to each other as shown in the figures. Alternatively, the first 46A and second 46B lips may be one continuous lip distinguishable by the angle which they extend relative to each other.

As shown in FIGS. 2A-2D, the pivot pin 20 may be disposed between the base 12 and the first flange 40A. As shown in FIG. 2D, the first lip 46A defines a slot 48 for receiving the pivot pin 20. The first channel 42A receives the first lip 46A. After the slot 48 receives the pivot pin 20, the support foot 24 may pivot about the pivot pin 20 to move the support foot 24 into the first orientation 26. In the embodiments shown in FIGS. 1-7 the pivot pin 20 may be cylindrical. However, it is to be appreciated that the pivot pin 20 may have any shape permitting rotation of the support foot 24.

As shown in FIGS. 2A-2D, the locking device 22 may be mounted to the second flange 40B. The second lip 46B engages with the locking device 22 to prevent movement of the support foot 24 from the first orientation 26 when the locking device 22 is in the engaged position 13.

As shown in FIG. 5, the second lip 46B may define an aperture 50 in communication with the second channel 42B to receive the locking device 22 for preventing movement of the support foot 24 from the first orientation 26.

Alternatively, the second channel 42B may receive the second lip 46B and the locking device 22 moves to the engaged position 13 such that the locking device 22 abuts the second lip 46B, trapping the second lip 46B in the second channel 42B.

In one embodiment shown in FIGS. 2A-2D, the cabinet assembly 10 may further include a stop 52 disposed between the base 12 and one of the first flange 40A and the second 40B flange. One of the first lip 46A and the second lip 46B may define a cut-out 54 to receive the stop 52 when the support foot 24 is in the first orientation 26. If the stop 52 is disposed between the first flange 40A and the base 12, then the first lip 46A defines the cut-out 54 to receive the stop 52. Alternatively, if the stop 52 is disposed between the second flange 40B and the base 12, then the second lip 46B defines the cut-out 54 to receive the stop 52.

In one embodiment, the stop 52 may be cylindrically shaped. It is to be appreciated that the stop 52 may take any shape capable of being received by the cut-out 54.

As shown in FIG. 2D, the first lip 46A may define a triangular shaped cut-out. The first lip 46A may define first 54A and second 54B walls to define a perimeter of the triangular shaped cut-out. The first 54A and second 54B walls may locate the first lip 46A to the stop 52 at a locating orientation between the first 26 and second 28 orientations such that as the support foot 24 rotates about the pivot pin 20 closer to the first orientation 26, one of the first 54A and second 54B walls makes contact with the stop 52 until the remaining wall makes contact with the stop 52. In this manner, the support foot 24 may consistently be located to the base 12 to ensure that the locking device 22 may engage properly with the second lip 46B. Alternatively, when the second lip 46B defines the triangular shaped cut-out, the second lip 46B locates the support foot 24 to the base 12 in a similar manner.

Figure 7:
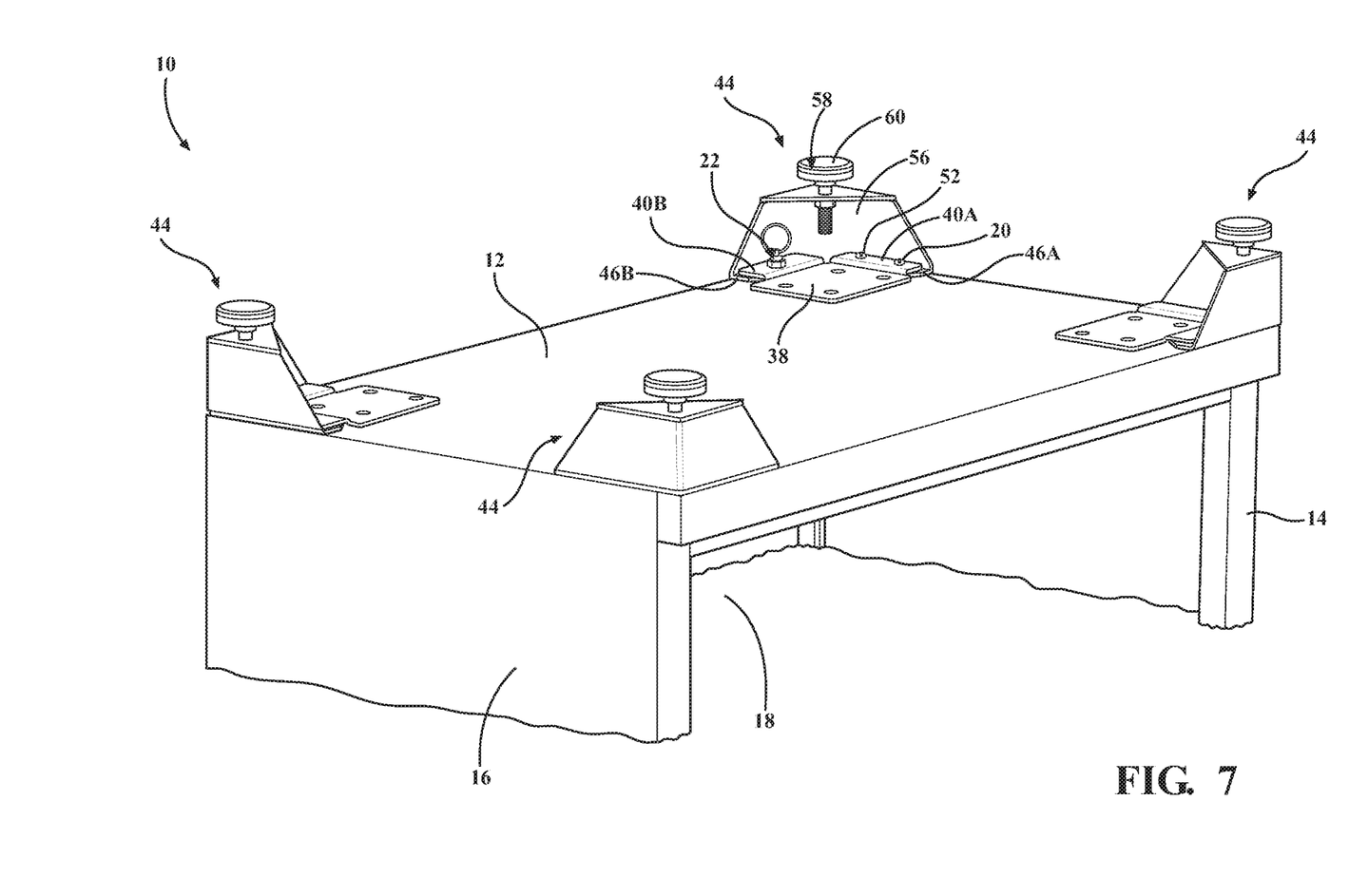
FIG. 7 is another perspective view of the cabinet assembly and the support assemblies with all of the support feet having leveling mechanisms.

As shown in FIG. 7, the support foot 24 may include a frame 56 extending from the first lip 46A and the second lip 46B. The support foot 24 may further include a leveling mechanism 58 coupled to the frame 56 for leveling the cabinet assembly 10 with respect to an exterior surface. The leveling mechanism 58 may include a pedestal 60 movably coupled to the frame 56 for adjusting distance between the base 12 and the exterior surface with the pedestal 60 defining a bottom surface 62 for abutting the exterior surface.

By way of example and as shown in FIG. 1, the cabinet assembly 10 includes one support foot 24 including a leveling mechanism 58 and another support foot 24 that does not include a leveling mechanism 58.

In one exemplary embodiment, the support foot 24 is in the first orientation 26. A user moves the securing component 34 into the released position 15, permitting the support foot 24 to pivot about the pivot pin 20. The user pivots the support foot 24 about the pivot pin 20 such that the second lip 46B moves away from the second flange 40B. The user then moves the first lip 46A of the support foot 24 away from the first flange 40A such that the slot 48 no longer receives the pivot pin 20. In this position, the support foot 24 is spaced from the cabinet assembly 10.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A cabinet assembly comprising:
a base;
walls secured to said base to define an interior;
a pivot pin coupled to said base;
a locking device coupled to said base and movable relative to said base between an engaged position and a released position; and
a support foot fixed to said base in a first orientation when said locking device is in said engaged position and said support foot movable about said pivot pin to a second orientation spaced from said locking device when said locking device is in said released position, and the said support foot is released from said pivot pin thereby being released from said base.

2. The cabinet assembly as set forth in claim 1, wherein said locking device remains coupled to said base as said locking device moves between said engaged position and said released position.

3. The cabinet assembly as set forth in claim 1, wherein said locking device comprises a stationary component fixed to said base and a securing component movably coupled to said stationary component and movable between said engaged and released positions, and wherein said securing component fixes said support foot to said base when said support foot is in said first orientation.

4. The cabinet assembly as set forth in claim 3, wherein said securing component is a pin.

5. The cabinet assembly as set forth in claim 3, wherein said locking device further comprises a biasing element for urging said securing component into said engaged position.

6. The cabinet assembly as set forth in claim 1, further including a bracket mounted to said base with said bracket having at least one flange extending parallel to said base and defining a channel between said flange and said base for receiving a portion of said support foot.

7. The cabinet assembly as set forth in claim 6, wherein said pivot pin, said locking device, said support foot, and said bracket collectively form a support assembly with said cabinet assembly including a plurality of said support assemblies.

8. The cabinet assembly as set forth in claim 6, wherein said support foot defines at least one lip extending from said support foot with said channel receiving said lip.

9. The cabinet assembly as set forth in claim 8, wherein said flange is further defined as a first flange and said bracket further includes at least a second flange extending parallel to said base and at an angle relative to said first flange.

10. The cabinet assembly as set forth in claim 9, wherein said channel is further defined as a first channel and said second flange defines a second channel between said second flange and said base for receiving another portion of said support foot.

11. The cabinet assembly as set forth in claim 10, wherein said support foot defines first and second lips extending from said support foot at an angle relative to each other with said first channel receiving said first lip and said second channel receiving said second lip.

12. The cabinet assembly as set forth in claim 11, wherein said pivot pin is disposed between said base and said first flange.

13. The cabinet assembly as set forth in claim 12, wherein said first lip defines a slot for receiving said pivot pin.

14. The cabinet assembly as set forth in claim 13, wherein said locking device is mounted to said second flange.

15. The cabinet assembly as set forth in claim 14, wherein said second lip engages with said locking device to prevent movement of said support foot from said first orientation when said locking device is in said engaged position.

16. The cabinet assembly as set forth in claim 15, wherein said second lip defines an aperture to receive said locking device for preventing movement of said support foot from said first orientation.

17. The cabinet assembly as set forth in claim 15, further comprising a stop disposed between said base and one of said first flange and said second flange.

18. The cabinet assembly as set forth in claim 17, wherein one of said first lip and said second lip defines a cut-out to receive said stop when said support foot is in said first orientation.

19. The cabinet assembly as set forth in claim 11, wherein said support foot includes a frame extending from said first lip and said second lip.

20. The cabinet assembly as set forth in claim 19, wherein said support foot further includes a leveling mechanism coupled to said frame for leveling the cabinet assembly with respect to an exterior surface.

\* \* \* \* \*

UNITED STATES PATENT AND TRADEMARK OFFICE
CERTIFICATE OF CORRECTION

PATENT NO. : 9,936,809 B2
APPLICATION NO. : 15/142631
DATED : April 10, 2018
INVENTOR(S) : Robert Vandenham Page 1 of 1

It is certified that error appears in the above-identified patent and that said Letters Patent is hereby corrected as shown below:

In the Claims

Column 5 Line 59: Please delete "and the said support foot is released" and insert: --and then said support foot is released--.

Signed and Sealed this
Eighteenth Day of September, 2018

Andrei Iancu
*Director of the United States Patent and Trademark Office*